United States Patent [19]
Cannon et al.

[11] Patent Number: 6,044,365
[45] Date of Patent: Mar. 28, 2000

[54] SYSTEM FOR INDEXING AND RETRIEVING GRAPHIC AND SOUND DATA

[75] Inventors: Thomas G. Cannon; Daniel L. DeHart, both of Loveland, Colo.

[73] Assignee: Onkor, Ltd., Loveland, Colo.

[21] Appl. No.: 08/115,937

[22] Filed: Sep. 1, 1993

[51] Int. Cl.[7] .................................................. G06F 17/60
[52] U.S. Cl. ............................................................ 707/2
[58] Field of Search .................................. 395/154–155; 364/419.19, 468, 400, 419.1, 419.11, 419.13; 707/2

[56] References Cited

U.S. PATENT DOCUMENTS

| | | | |
|---|---|---|---|
| 4,358,824 | 11/1982 | Glickman et al. | 707/5 |
| 4,384,329 | 5/1983 | Rosenbaum et al. | 704/10 |
| 4,916,614 | 4/1990 | Kaji et al. | 704/2 |
| 5,007,019 | 4/1991 | Squillante et al. | 707/532 |
| 5,036,472 | 7/1991 | Buckley et al. | 700/233 |
| 5,056,029 | 10/1991 | Cannon | 700/233 |

(List continued on next page.)

OTHER PUBLICATIONS

R.G. Crawford & H.S. Becker, "A Novice User's Interface to Information Retrieval Systems," Information Processing & Management, vol. 22, 1986, pp. 287–298.

Gary W. Strong & M. Carl Drott, "AThesaurus for End–User Indexing and Retrieval," Information Processing & Management, vol. 22, 1986, pp. 487–492.

Timothy C. Craven, "Adapting of String Indexing Systems for Retrieval Using Proximity Operators," Information Processing & Management, vol. 24, 1988, pp. 133–140.

C.J. Crouch, "An Approach to the Automatic Construction of Global Thesauri," Information Processing & Management, vol. 26, 1990, pp. 629–640.

U. Guntzer, G. Juttner, G. Seegmuller, & F. Sarre, "Automatic Thesaurus Construction by Machine Learning from Retrieval Sessions," Information Processing & Management, vol. 25, 1989, pp. 265–273.

Marcia J. Bates, "Subject Access in Online Catalogs: A Design Model," Journal of the American Society for Information Science, vol. 37, 1986, pp. 357–376.

K. Sparck Jones & J.I. Tait, "Automatic Search Term Variant Generation," Journal of Documentation, vol. 40, 1984, pp. 50–66.

"Russian Software Heads West," PC Magazine, Oct. 26, 1993, p. 31.

"PixTex/EFS Electronic Filing Software Executive Summary," brochrue, Excalibur Technologies.

Maria V. Georgianis, "Windows HElp–Desk Software Learns on the Job," Computer Reseller News, Nov. 8, 1993.

Richard Adhikari, "Cognitive Processing Help Desk Software Released," Canada ComputerWorld, Oct. 22, 1993.

Molloy Group information indicating features of software.

"Automatic Use of a Thesaurus to Make Keyword Search More Usable," IBM Technical Disclosure Bulletin, May 1988, pp. 117–118.

Primary Examiner—Anton W. Fetting
Attorney, Agent, or Firm—Dorr, Carson, Sloan & Birney, P.C.

[57] ABSTRACT

A system for indexing and retrieving graphic and sound data ("entity data") employs a thesaurus of descriptors and equivalent words (e.g., synonyms, metonyms, foreign language equivalents, and misspellings). The system can be used, for example, to index and retrieve images, sounds, and related data for social expression cards, video segments, multimedia presentations, photographs, audio data, and the like. The thesaurus is built by allowing the user to specify a number of descriptors and equivalent words ("meaning referent sets") for each entity data, incorporating these descriptors and meaning referent sets into the thesaurus, and linking the entity data to the meaning referent sets in the thesaurus by using entity identifiers. Entity data can then be retrieved by prompting the user to specify a list of descriptors, locating the descriptors and any associated meaning referent sets in the thesaurus, and retrieving entity data linked to these meaning referent sets.

15 Claims, 14 Drawing Sheets

U.S. PATENT DOCUMENTS

| | | | |
|---|---|---|---|
| 5,107,343 | 4/1992 | Kawai | 382/305 |
| 5,136,655 | 8/1992 | Bronson | 704/270 |
| 5,167,011 | 11/1992 | Priest | 386/106 |
| 5,172,245 | 12/1992 | Kita et al. | 358/403 |
| 5,241,671 | 8/1993 | Reed et al. | 707/104 |
| 5,299,122 | 3/1994 | Wang et al. | 707/1 |
| 5,309,359 | 5/1994 | Katz et al. | 707/102 |

Fig. 10(a)
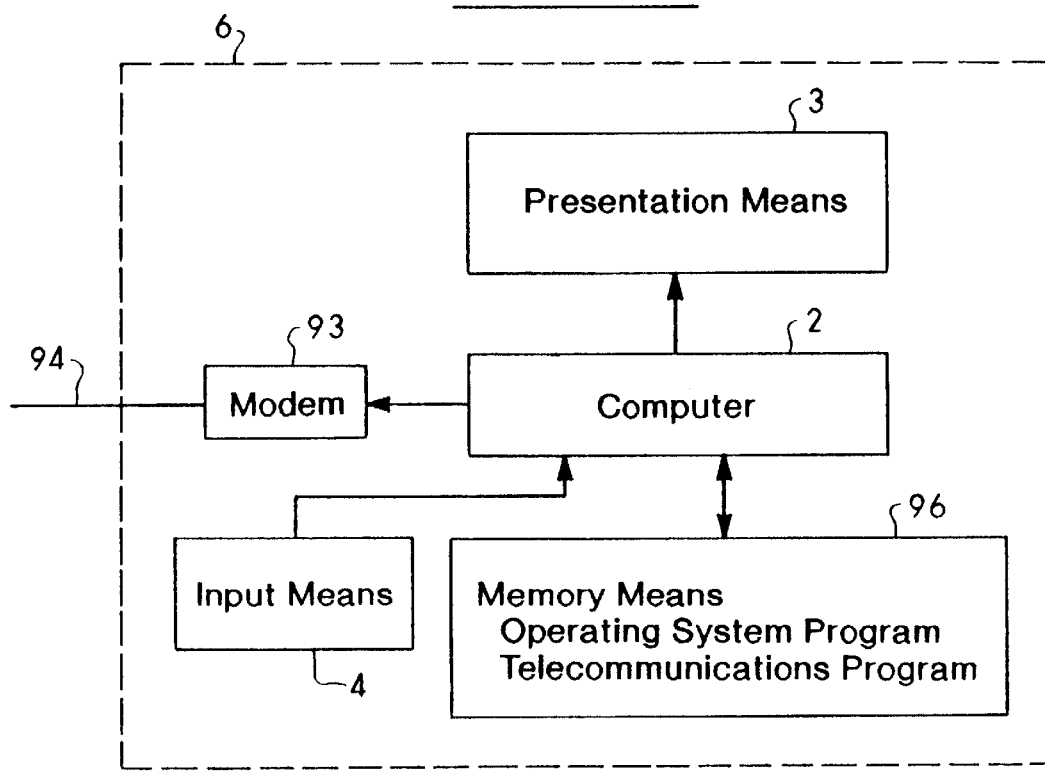
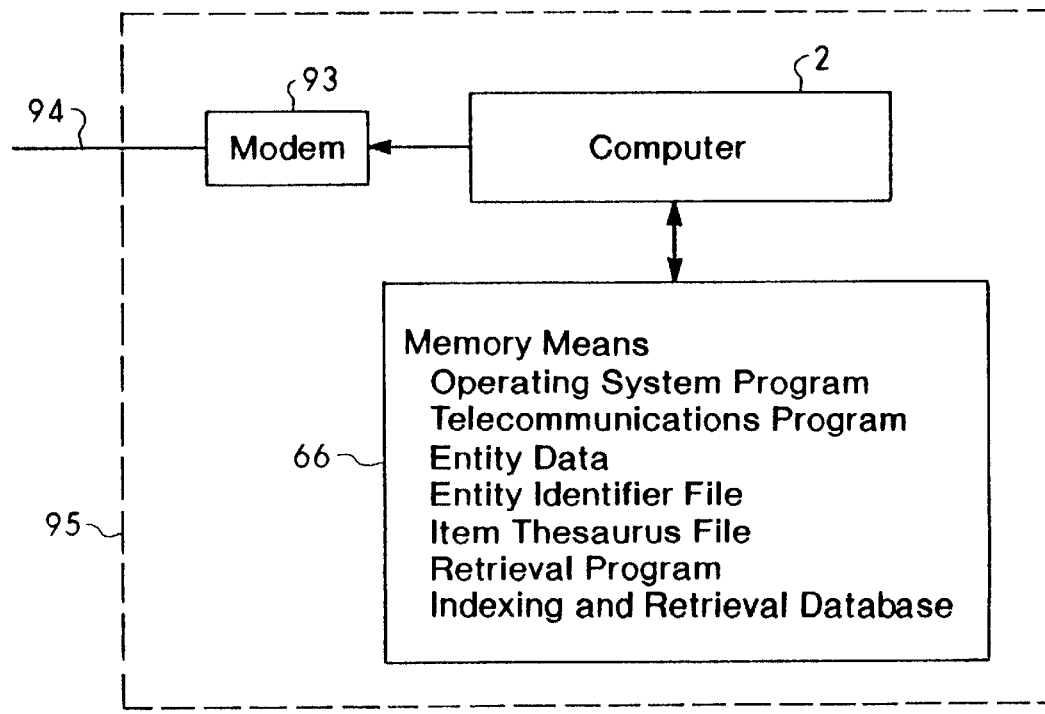
Fig. 10(b)

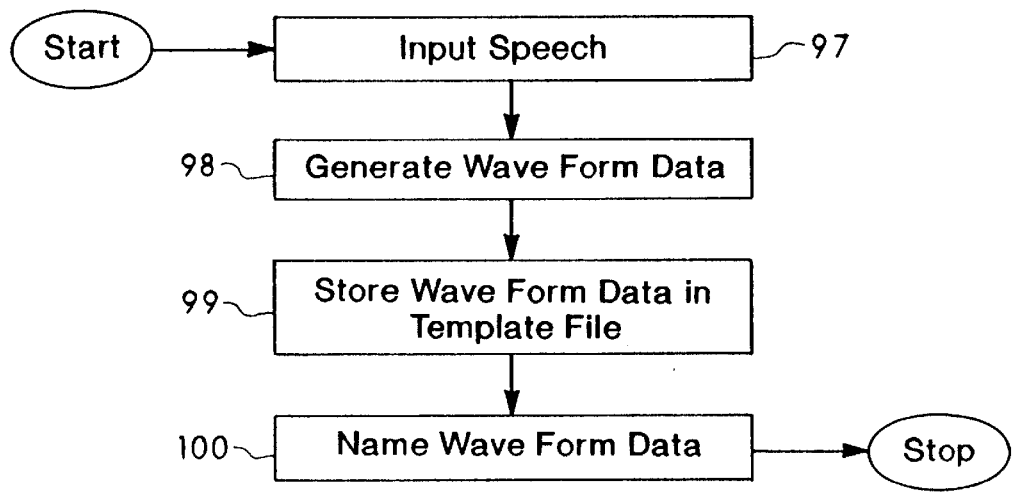
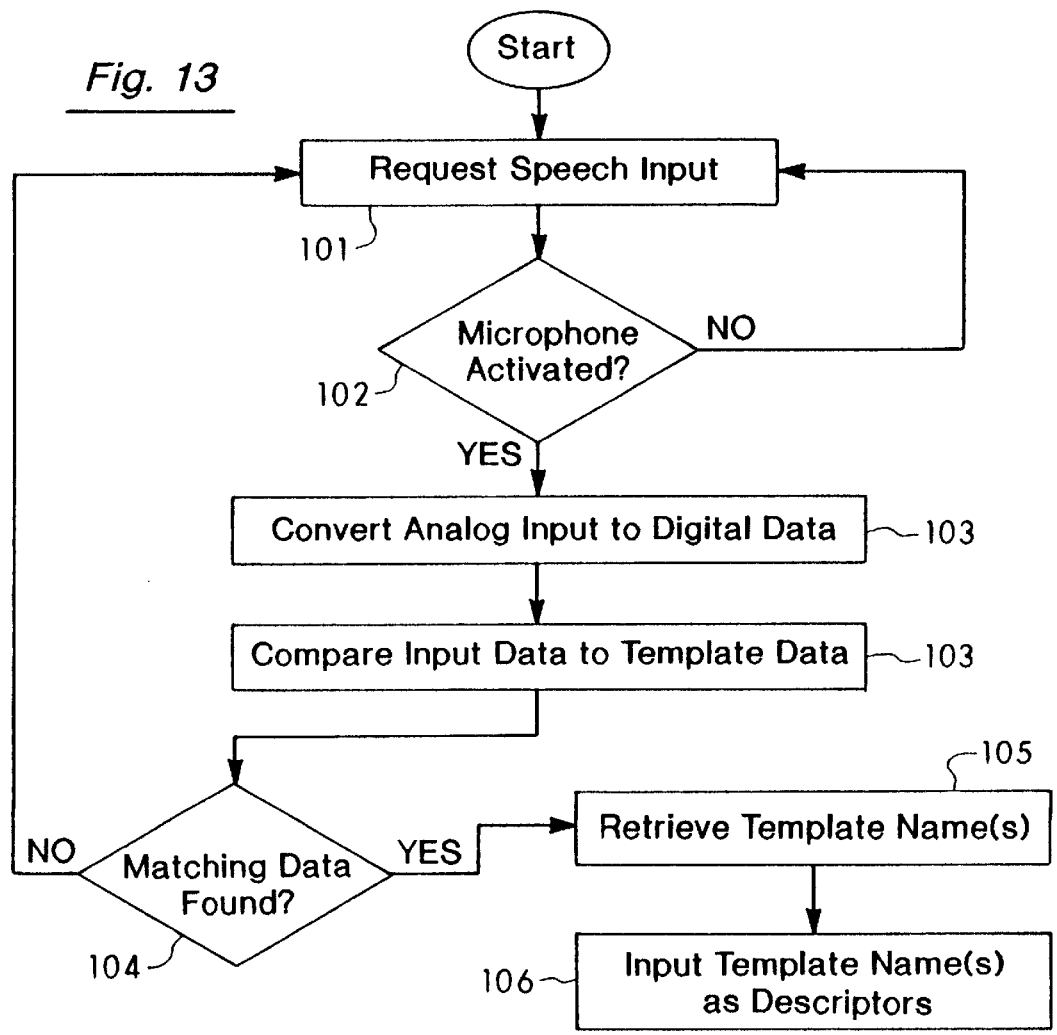

SYSTEM FOR INDEXING AND RETRIEVING GRAPHIC AND SOUND DATA

BACKGROUND OF THE INVENTION

1. Field of the Invention

The present invention relates to the field of computer systems used to index and retrieve digitized images, digitized sounds, and related data, including social expression card designs, multimedia presentations, and the like.

2. Statement of the Problem

Computer systems that allow users to view images stored in digital form have been used in various computer applications for many years. Recently, interactive computer-based systems have been developed that allow consumers and others who are not computer literate to view images, including images of various products with associated text, and hear sounds such as speech and music, as part of a purchase process, educational process, or other activity. Often, retrieval of entities to be displayed by such systems requires the user to select descriptive text, symbols, or other items displayed in a series of hierarchical menus or scrolling lists. After one or a series of menu items have been selected, the corresponding images and related information are retrieved and displayed for the user.

Several computer-based systems that allow images to be retrieved by using a menu system and displayed have been invented in the past, including the following:

| Inventor | U.S. Pat. No. | Issue Date |
| --- | --- | --- |
| Kita et al. | 5,172,245 | Dec. 15, 1992 |
| Cannon | 5,056,029 | Oct. 8, 1991 |
| Buckley et al. | 5,036,472 | July 30, 1991 |

"CreataCard" system was introduced by Custom Expressions, Inc., Glendale, California, in May 1990.

U.S. Pat. No. 5,056,029 was previously issued to one of the present inventors. This patent discloses a system for manufacturing and vending social expression cards that queries the customer to input a series of special occasion parameters to select and display a group of cards from a database of available card designs.

The "CreataCard" system was introduced by Custom Expressions, Inc., in May 1990. This system is an on-site unit for drawing and vending personalized social expression cards that uses a menu to allow customers to display a series of card images on a touch-sensitive display screen. After choosing the desired card, the customer enters information to personalize the card, such as names, dates, ages, messages, etc.

Kita et al. disclose an electronic information retrieval apparatus for image information that uses primary and secondary menus.

Buckley et al. disclose a computer-controlled machine for vending printed products, including personalized greeting cards and the like. The user selects the type of product desired from a displayed menu. The unit provides audio and video presentations of the products and options available to the customer. Base products such as preprinted forms are stored within the unit for transfer by a robotic arm to a printer for customization.

There are also a number of commercially available software programs that allow personal computer systems to print greeting cards. "Card Shop" by Artsci, Inc., allows Macintosh computer users to select from a menu of approximately fifty greeting cards covering a variety of occasions.

Social expression cards include greeting cards, invitations, announcements, and the like and are referred to herein as "greeting cards" or "social expression" cards. Current greeting card systems usually require the user to first select a menu item representing a general card category, such as "Birthday" or "Sympathy," from a displayed menu of general categories. Selection is typically accomplished by using a touch screen or other input device. After selecting a general category (e.g., "Birthday"), the user is prompted to select one subcategory from each of several additional sequentially displayed menus to further define the particular type of image the user is interested in viewing. The menu displayed after each selection is determined by the menu item previously selected and is typically made up of items that can be considered a logical subcategory of the menu item previously selected. For example, logical menu items that might be presented in a greeting card design retrieval system after selection of "Birthday" would be "Friend" and "Relative." If the menu item "Relative" is selected, then a menu with the items "Father," "Mother," "Brother," and "Sister" would logically be presented. After the last menu item is selected (e.g., "Brother"), one or more greeting card images, having characteristics defined by the menu items previously selected (i.e., "Birthday", "Relative" and "Brother") are displayed for examination by the consumer.

Image retrieval systems, such as current greeting card systems, typically have a large number of images available for users to view. Each image has a number of characteristics including, for example, the character and content of graphic elements of the image and the character and content of text elements displayed with the image. The use of a hierarchical menu to limit displayed images to those of particular interest to a user is a more efficient means to locate such images than traditional means, such as, in the case of greeting cards, racks in retail outlets that display thousands of cards and typically group cards in broad categories by publisher.

One significant problem in using a menu in the manner described is that a predetermined hierarchical menu structure necessarily means that the menu items available for selection are limited in number and that the sequence in which menu items can be chosen is fixed. Since a user may have a very personal way of conceptualizing the important characteristics of a desired greeting card design, the menu items presented may include characteristics that are not important to the user, the menu items presented may not include characteristics that are important to the user, and the menu item words or symbols used to represent specific characteristics may not be the same as those which the user has in mind to describe the same characteristics.

These problems can be overcome in part by increasing both the number of items available on each menu and the number of menus presented before entities, such as greeting card designs, are displayed or presented. However, beyond a certain point, both the time required to traverse the menus presented and the difficulty a user may have in choosing between menu items perceived as unimportant or irrelevant defeat the purpose of using menus. The purpose is to quickly present a user with entities, such as greeting card designs, whose characteristics match those desired by the user.

The most common alternative method used to search image databases is accomplished by attaching lists of words, phrases, characters, or symbols that describe or represent image characteristics ("keywords") to each image file and then performing searches by entering one or more keywords to retrieve those images that have matching keywords.

A computer-based system that allows images to be retrieved by using keywords is discussed in U.S. Pat. No. 5,107,343 of Kawai, issued on Apr. 21, 1992. Kawai discloses an information searching system for image data in which a character or symbol is used as a keyword for a still or moving picture in order to display a still or moving picture associated with a piece of music.

There are a number of commercially available software programs that allow computer systems to retrieve various types of graphic data by using keywords, as discussed in the article entitled "Managing Your Media," *MacUser* (September 1993, pages 190–206). Users of these programs must first enter descriptive keywords that are attached to each graphic item before the item data can be retrieved by using the keywords. Subsets of one or more graphic data items can then be retrieved by entering one or more of the keywords previously associated with the data items. For example, the program "ImagePals" (U-Lead Systems, Inc., 970 West 190th Street, Suite 520, Torrance, Calif. 90502) allows miniature representations of images ("thumbnails") to be retrieved and displayed by entering graphic data attributes in the form of a text description attached earlier to each graphic data item.

Searching for graphic data items by using more than one attribute or keyword typically requires the use of the logical or Boolean operators AND, OR, and NOT. The program "NeoView" (Neotech Systems, Inc., 103 West 61st Street, Westmont, Ill. 60559) allows various types of images, including document images and photographs, to be retrieved in several ways including free-form entry of previously indexed keywords or phrases input by the user and associated with images.

A major problem with this method of using keywords to retrieve entities is that a user must use the same keywords to describe an entity as were used in the initial indexing process. While a user might guess some keywords that should be used, there is no way for a user to be confident that the keywords he or she might use to describe the characteristics of an entity will in fact retrieve all the available entities that have the characteristics the user is attempting to describe.

One method of solving this problem is to restrict the keywords that can be used to retrieve entities to a specific set of keywords ("controlled keyword vocabulary"). For example, U.S. Pat. No. 5,167,011 of Priest, issued on Nov. 24, 1992, discloses a method to coordinate the storage and retrieval of information by using controlled vocabulary terms to link functions. Controlled keyword vocabularies are widely used in information retrieval systems used to retrieve text documents. Various methods to improve the effectiveness of such systems have been evaluated including the use of some type of thesaurus so the terminology of an indexer can be reconciled with that of a searcher. The ideal thesaurus for use in such a system is considered by some to be one containing any term applied by any user to an object or entity where each of the terms is used as a referent to that object or entity. It has been demonstrated experimentally that while any one individual can normally think of only a few synonymous terms to describe an entity, the total number of different terms used by a group of persons to describe the same entity will be quite large. Another problem occurs when a word has more than one meaning ("polysemy") and therefore is used to refer to a number of entities that are not alike; for example, the word "stamp" could refer to either a postage stamp or a rubber stamp.

A number of computer-based systems for storing and retrieving related linguistic expressions (including synonyms) from a large database have been invented in the past, including the following:

| Inventor | U.S. Pat. No. | Issue Date |
| --- | --- | --- |
| Squillante et al. | 5,007,019 | Apr. 9, 1991 |
| Kaji et al. | 4,916,614 | Apr. 10, 1990 |
| Rosenbaum et al. | 4,384,329 | May 17, 1983 |

Squillante et al. disclose an electronic thesaurus that enables a user to track through a series of related words to obtain an extensive set of related meanings.

Kaji et al. disclose a system for performing automatic language translation comprising a first memory to store a source language analysis dictionary, a second memory to store a target language generation dictionary, a third memory to represent co-occurrence relation, a thesaurus memory to represent implication among concepts, a source language input device, a target language output device, and a processor to translate a source language sentence into a target language sentence by utilizing the first, second, third, and thesaurus memories.

Rosenbaum et al. disclose a storage method and control system for storing and interactively accessing a large database of related linguistic expressions such as synonyms and antonyms.

3. Solution to the Problem

None of the prior art describes a method and apparatus that allows graphic, sound, and related data, such as greeting card designs, to be rapidly and efficiently indexed and retrieved by using freely chosen keywords where the keywords as well as equivalent words, such as synonyms, metonyms, misspellings, and foreign language equivalents of the keywords, are automatically linked to the images.

SUMMARY OF THE INVENTION

It is an object of this invention to provide an efficient means for retrieval of graphic and sound data ("entity data"), such as greeting card designs, from a large database by allowing a user to input a set of keywords describing characteristics of the entity data to be retrieved. The set of keywords is then automatically expanded to include equivalent words, such as synonyms, metonyms, misspellings, and foreign equivalents. This expanded set of keywords is then used for retrieval of entity data from the database having the desired characteristics. Keywords can be input in the form of a free-form word string, a sentence, phrase, or group of words, using a keyboard, mouse, or other input device. Alternatively, a microphone and voice recognition software can be employed to convert a spoken sentence, phrase, or group of words into keywords that can then be used for retrieval of entity data from the database.

Another object of the present invention is to provide a means whereby each descriptive keyword entered during the indexing process by a person adding an entity to the database will be automatically attached to a meaning referent set consisting of equivalent words, such as synonyms, metonyms, misspellings, and foreign language equivalents of the keyword. This meaning referent set is then automatically linked to the entity. This allows a meaning referent set to be automatically created and logically linked to all of the appropriate entities in the database during the indexing process.

Another object of the present invention is to provide a means whereby a person searching a database can input keywords that are different from but have the same meaning as keywords input by persons who indexed the entities in the database and thereby retrieve the indexed images and related data described by keywords with common meanings.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIGS. 10(a) and 10(b) are schematic diagrams of a computer system used to retrieve and present entity data accessed through a modem.

FIG. 12 is a flow chart of the indexing process when speech is the input means used to retrieve entity data.

FIG. 13 is a flow chart of the retrieval process when speech is the input means used to retrieve entity data.

DETAILED DESCRIPTION OF THE INVENTION

Figure 1:
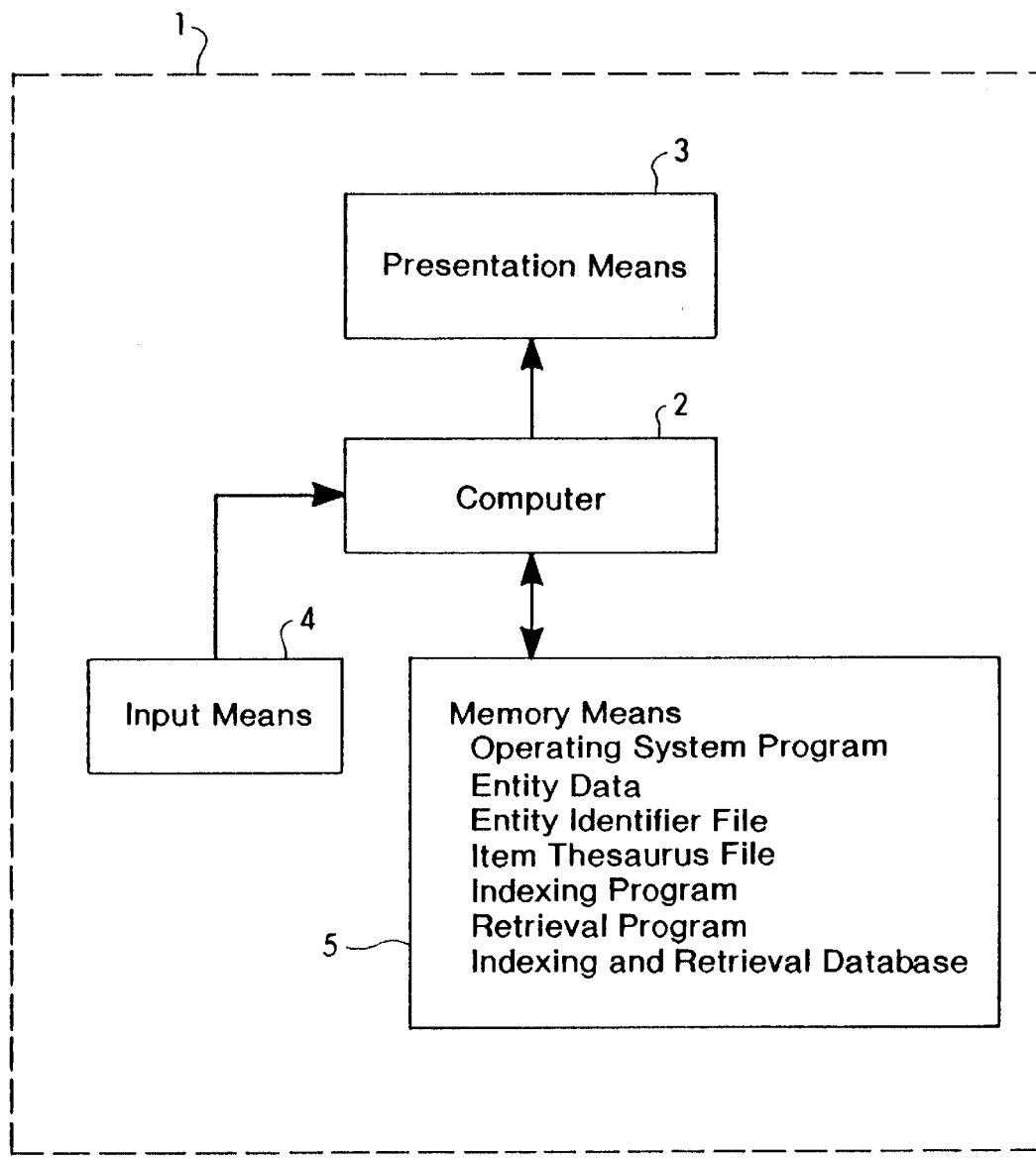
FIG. 1 is a schematic diagram of a computer system used for indexing and retrieving entity data.
Figure 2:
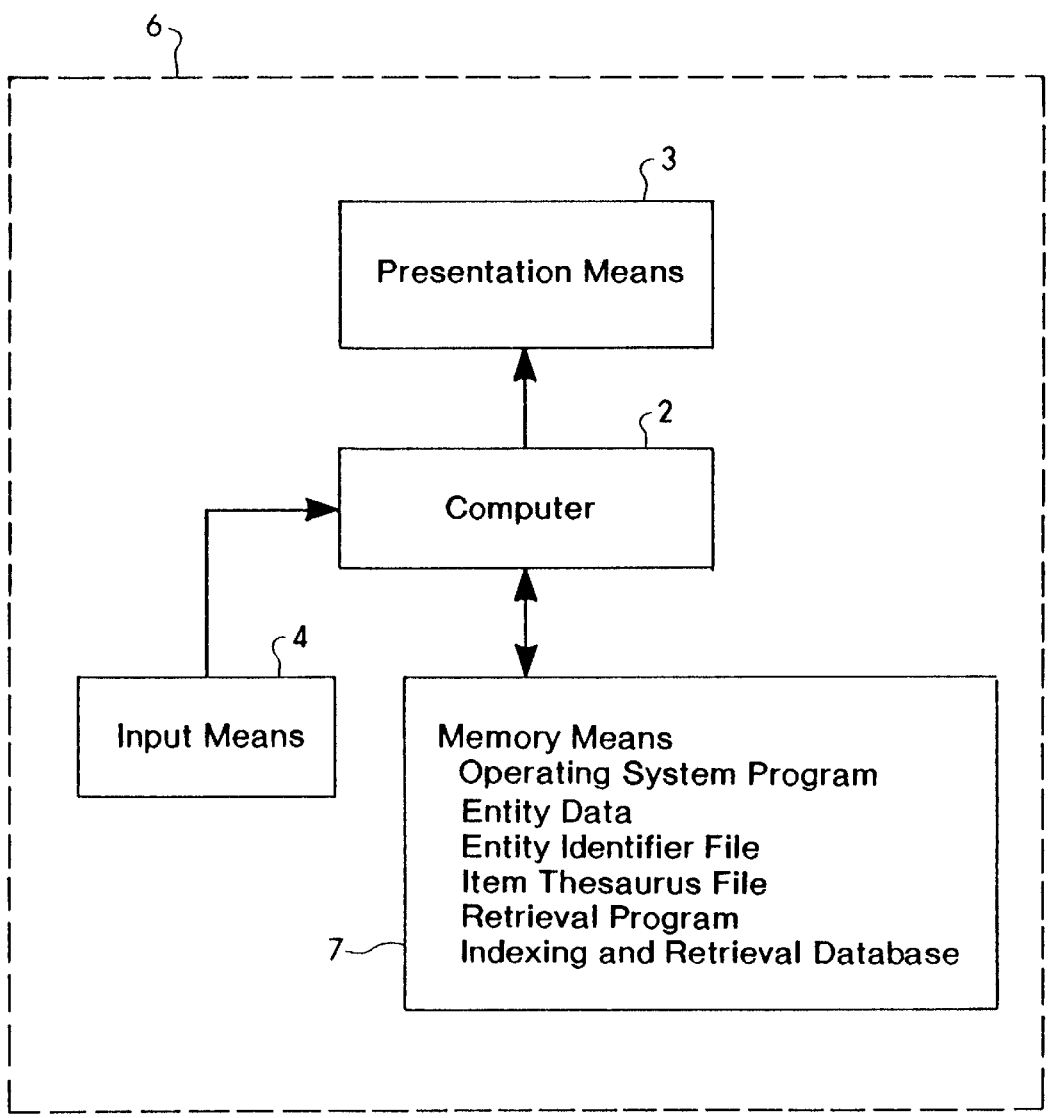
FIG. 2 is a schematic diagram of a computer system used for retrieving entity data.

FIG. 1 shows an overall schematic diagram of a computer system 1 used for indexing and retrieving images, sounds, and related data, such as data for social expression cards or multimedia segments. For the sake of convenience, each set of images, sounds, and related data (e.g., a single greeting card or a single multimedia presentation) constitutes an "entity" and the data associated with each entity is referred to as "entity data." FIG. 2 shows an overall schematic diagram of a computer system 6 used for retrieving entity data. The steps in the indexing process and the retrieval process are outlined in the flow charts provided in FIGS. 3 and 4, respectively.

Figure 3A:
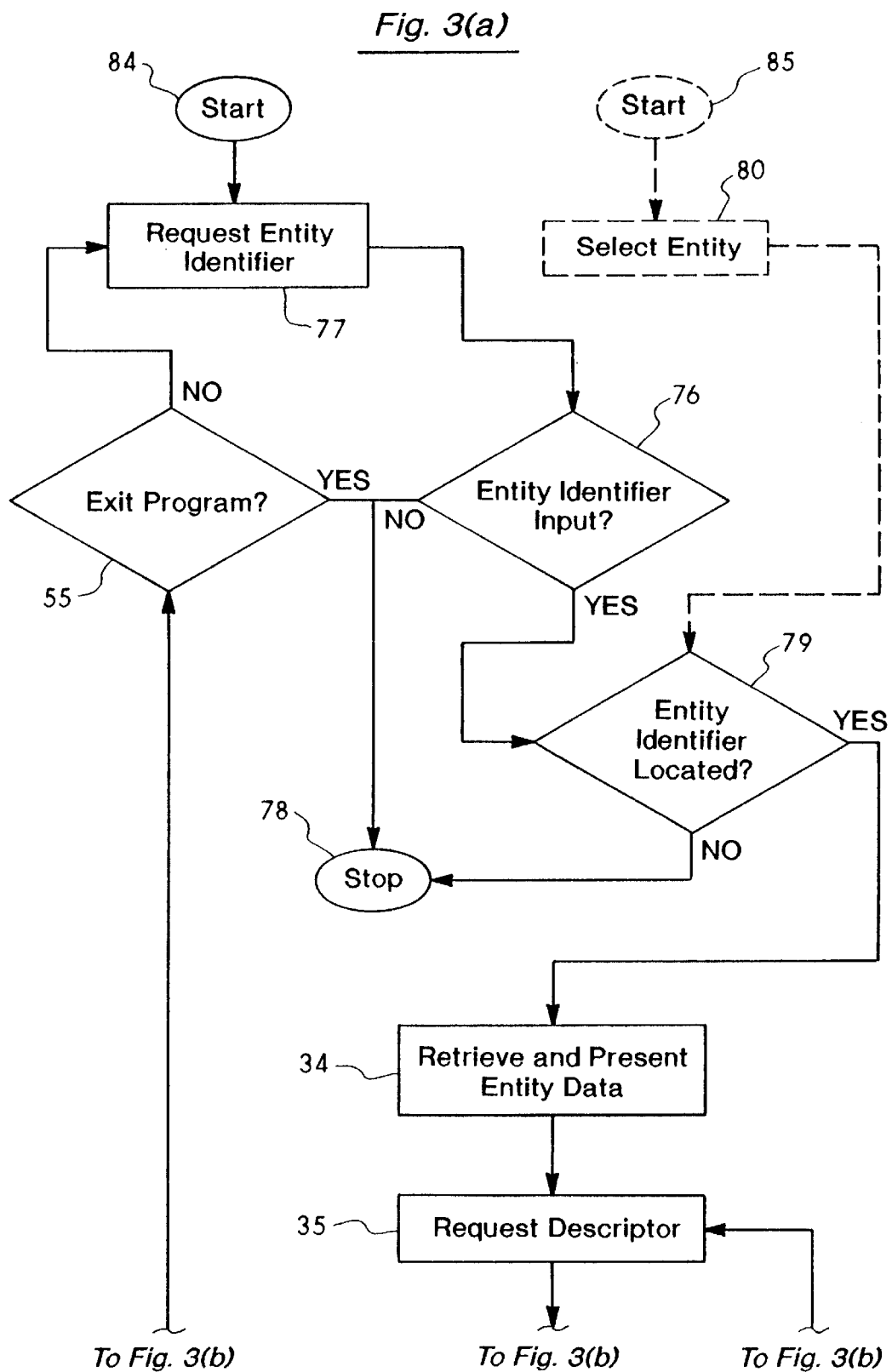
FIGS. 3(a) and 3(b) are flow charts of the overall method for indexing entity data by this invention.
Figure 3B:
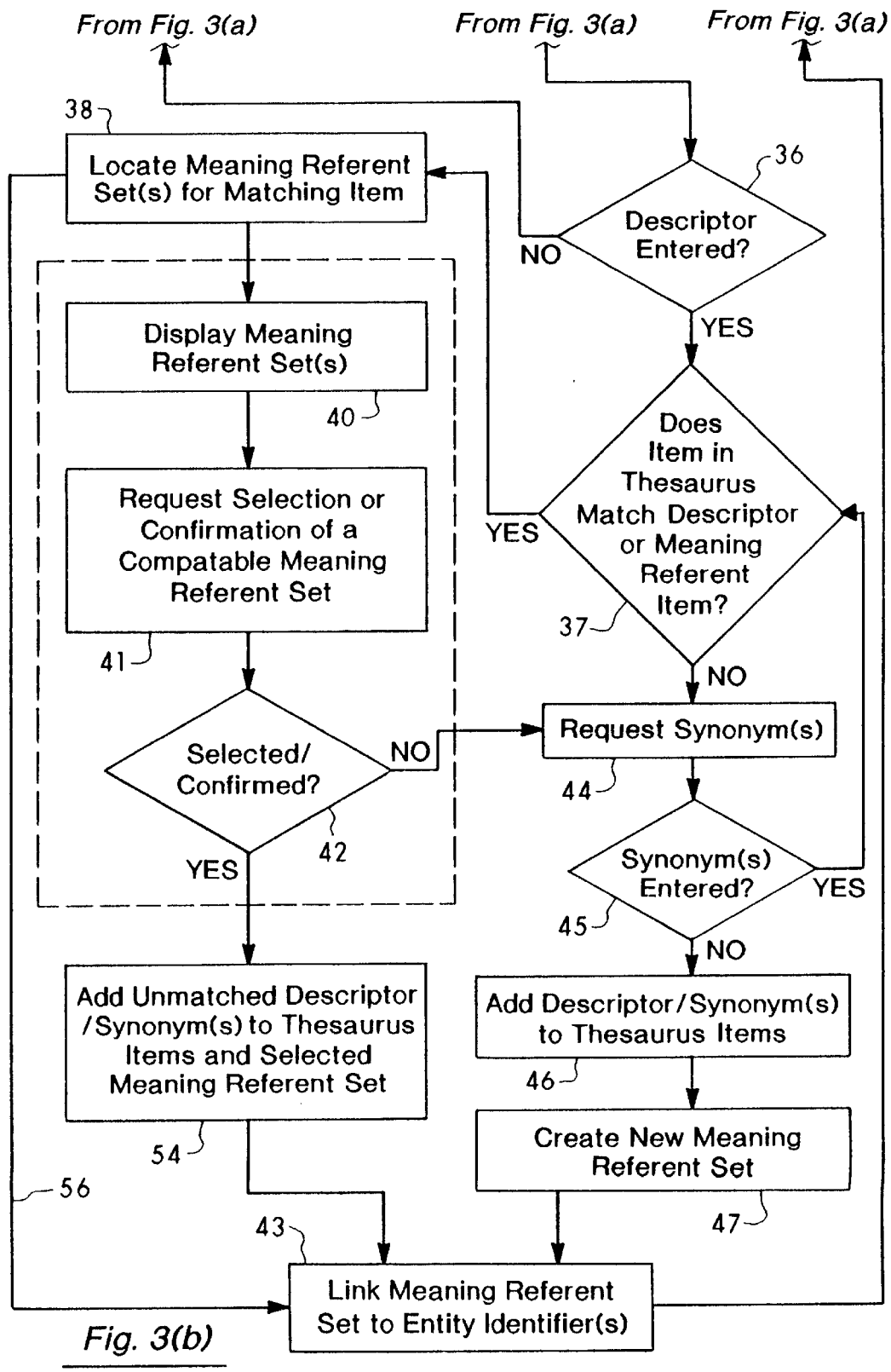
Figure 5:
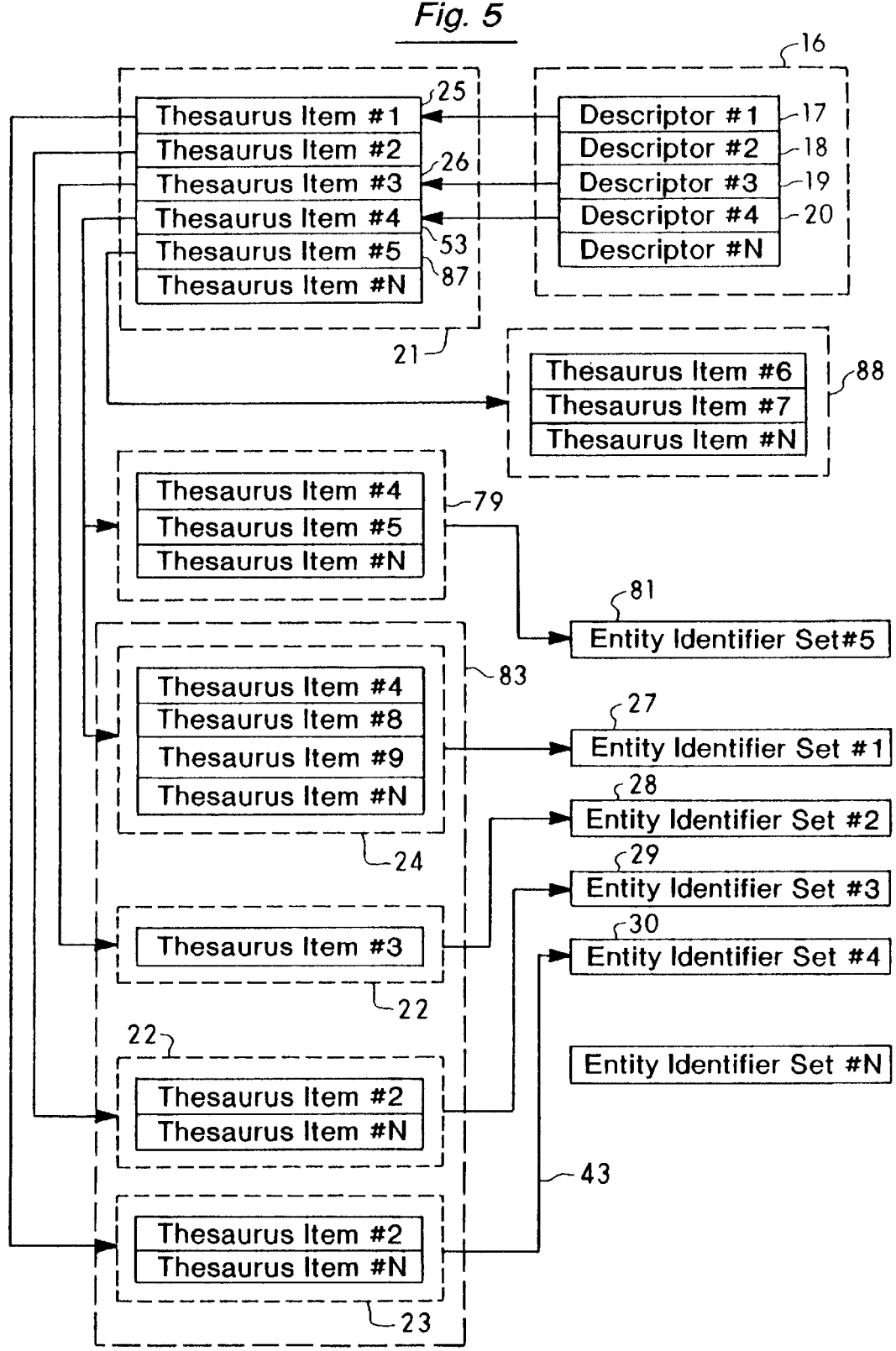
FIG. 5 is a diagram of relationships among indexing and retrieval data sets.
Figure 7:
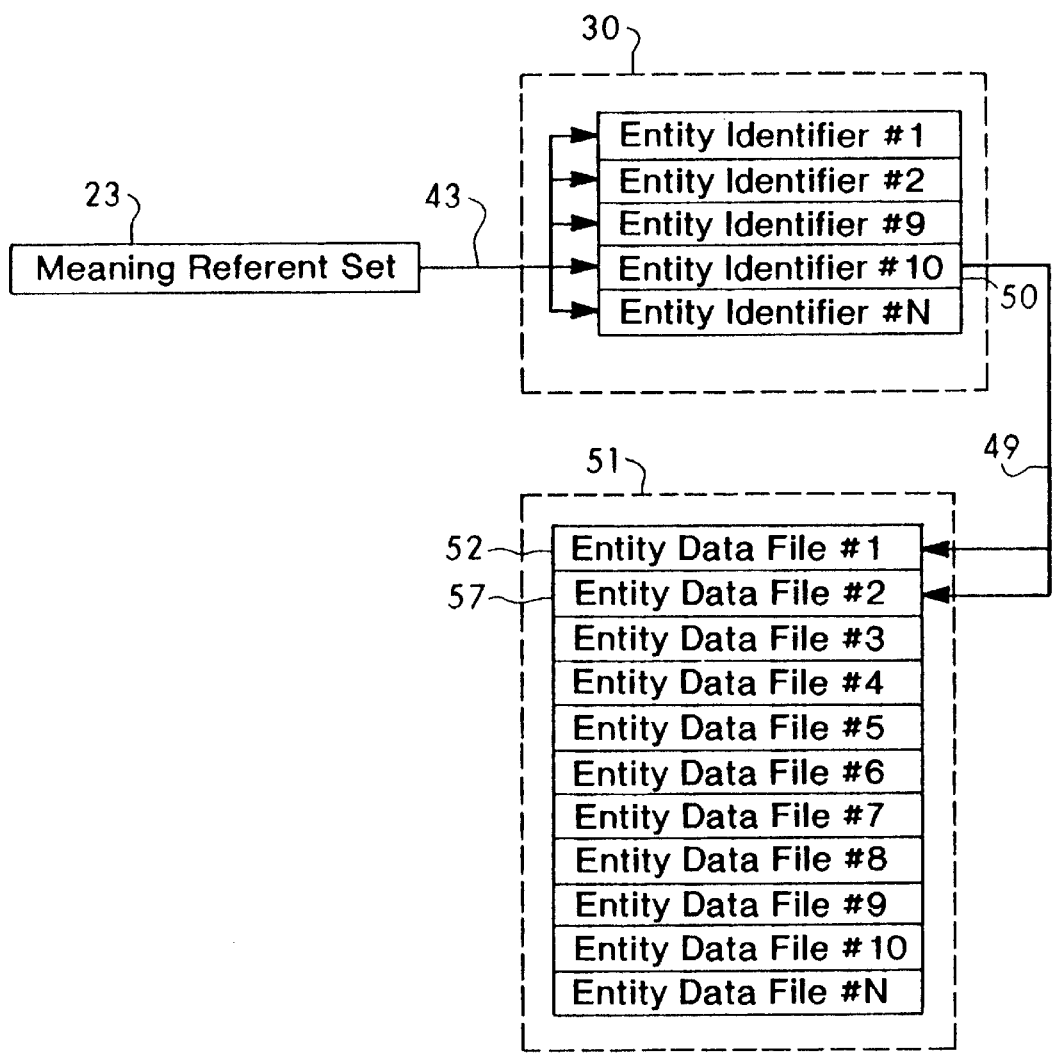
FIG. 7 is a diagram of the relationship between entity identifiers and entity data files.

Turning to FIGS. 1, 3, and 7, a single entity may include one or more graphic files, text files, sound files, formatting information, and other related data. All of these entity data files are stored in a memory 51, as shown in FIG. 7, for example, a hard disk drive or CD-ROM. Each set of entity data is logically linked to an entity identifier, for example, a greeting card design identified by a character string such as "LOO0312." To facilitate the indexing of an entity, the first step in the indexing process 84, shown in FIG. 3, is to retrieve the data that constitutes the entity and present such data to the person doing the indexing ("indexer") 34. One preferred method of initiating the retrieval process 84 is for the indexer to input a character string (e.g., "LOO0312") as an entity identifier 76 in response to a prompt 77. A second preferred method of initiating the retrieval process 85 is for the indexer to select an entity directly 80, for example, by highlighting one of a number of displayed images, symbols, or icons each representing a different entity. For example, a group of greeting card front page images can be displayed in reduced (or thumbnail) form. Other methods of initiating the retrieval process are also possible and would be obvious to one skilled in the art. After the entity data is presented, the indexer is requested to input a first descriptor 35. For example, assume the system is being used to index and display social expression cards and a first entity has been presented, for example, a greeting card design with the entity identifier "LOO0312." As shown in FIG. 7, this entity consists of a first entity data file 52 containing graphic data of a winter scene of cross country skiers, and a second entity data file 57 in the form of a text file containing the words "Merry Christmas!" All of the files are stored in a memory 5, shown in FIG. 1, such as a 1.2 gigabyte Micropolis Model 1598-15 hard drive (Micropolis, Inc., Chatsworth, Calif.) connected to a computer 2, such as an IBM PC compatible having eight megabytes of random access memory (RAM), that enables the card data to be retrieved and displayed on a color monitor 3, such as a Goldstar Model 1460 Plus (Goldstar Co., Ltd., Seoul, Korea). The computer also includes input means 4, such as a keyboard. Upon input of a descriptor 17, as in FIG. 5, such as the word "CHRISTMAS," an indexing program (e.g., Where-O-Ware?, Onkor, Ltd., P.O. Box 240, Masonville, Colo. 80541) compares the descriptor character string with a list of items in an item thesaurus file 21 stored in a memory, such as a hard disk drive 5. Items may include, for example, continuous character strings or character strings separated by spaces, for example, "BIRTHDAY" and "BIRTH DAY." If the searching process 39 shown in FIG. 3 finds a matching item 25 (i.e., the character string "CHRISTMAS") in the item thesaurus file 21, the corresponding meaning referent set 23 shown in FIG. 5 consisting of those items stored in the item thesaurus file that have the same meaning as the descriptor, for example, "CHRISTMAS," "XMAS," "XMASS," "YULE," "YULETIDE," "CRISTMAS," "WEIHNACHTEN," "NAVIDAD," etc., is displayed on the color monitor 3. The indexer is then requested 41 as shown in FIG. 5 to confirm that the meaning of items in the meaning referent set is compatible with the meaning intended for the descriptor input by the indexer. As shown in FIG. 3, confirmation 42 may be indicated by activating the input means 4 (e.g., by pressing the "Enter" key). Upon receiving a confirmation input, the meaning referent set 23 shown in FIGS. 5 and 7 is linked 43 to the corresponding entity identifier 30. Each of the entity identifiers 30 is represented by a character string that has been previously linked 43 to one or more entity data files. For example, entity identifier 50 is logically linked 49 as shown in FIG. 7 to a first entity data item 52 and a second entity data item 57.

Alternatively, if a descriptor 19 is found to have a matching thesaurus item 26 that has only one associated meaning referent set 73, the synonym referent set 73 is immediately linked 43 to the corresponding entity identifier 28 as above, as shown in FIG. 5 and the alternative path 56 in FIG. 3.

In the event a matching thesaurus item 53, shown in FIG. 5, is found in two or more meaning referent sets 24 and 64, these sets are displayed on the monitor 3. The indexer is then requested 41, as shown in FIG. 3, to select the meaning referent set having items whose meaning is compatible with the meaning intended for the descriptor input by the indexer. For example, selection 42 may be made by the indexer by highlighting the desired meaning referent set by pressing the "Tab" key on the keyboard 4 one or more times and then pressing the "Return" key.

If a descriptor 18 does not have a matching item in the item thesaurus file 21, as shown in FIG. 5, the indexer is requested to input one or more synonyms 44 for the descriptor, as shown in FIG. 3. If one of the synonyms input has a matching item in the item thesaurus file 21, shown in FIG. 5, then one or more meaning referent sets are displayed for selection, as before. After selection 42, shown in FIG. 3, the descriptor and any synonyms input by the indexer that are not matched by items in the item thesaurus file are added 54 to the item thesaurus file 21 and the meaning referent set selected by the indexer.

If none of the synonyms input by the indexer has a matching item in the item thesaurus file 21, then the descriptor and synonyms input are added 46 to the item thesaurus file 21 and a new meaning referent set is created 47 with the new meaning referent set items being the descriptor and its synonyms. The new meaning referent set is then linked 43 to one or more entity identifiers as before.

In the preferred embodiment, one or more meaning referent sets 88, shown in FIG. 5, may be created without being linked at the time of creation to entity identifiers. Such meaning referent sets may be created by an indexer entering one or more items 87 directly into the item thesaurus and designating the items be included in a meaning referent set 88. Such meaning referent sets can also be created by importing items from an existing computer-based thesaurus such as MultiLex Professional Thesaurus (MultiLing International, Inc., P.O. Box 169, Provo, Utah 84601).

After each descriptor has been processed, a request is made for a new descriptor 35, as shown in FIG. 3. If no descriptor is input, or if the indexer enters a predetermined exit code (e.g., the "Enter" key) indicating that the indexer has completed inputting descriptors for the entity being described, the indexer may exit the program 55 or repeat the process for a new entity. In the preferred embodiment, the process may be repeated for a new entity by, for example, inputting an entity identifier 76 for a new greeting card in response to a prompt 77.

Figure 11:
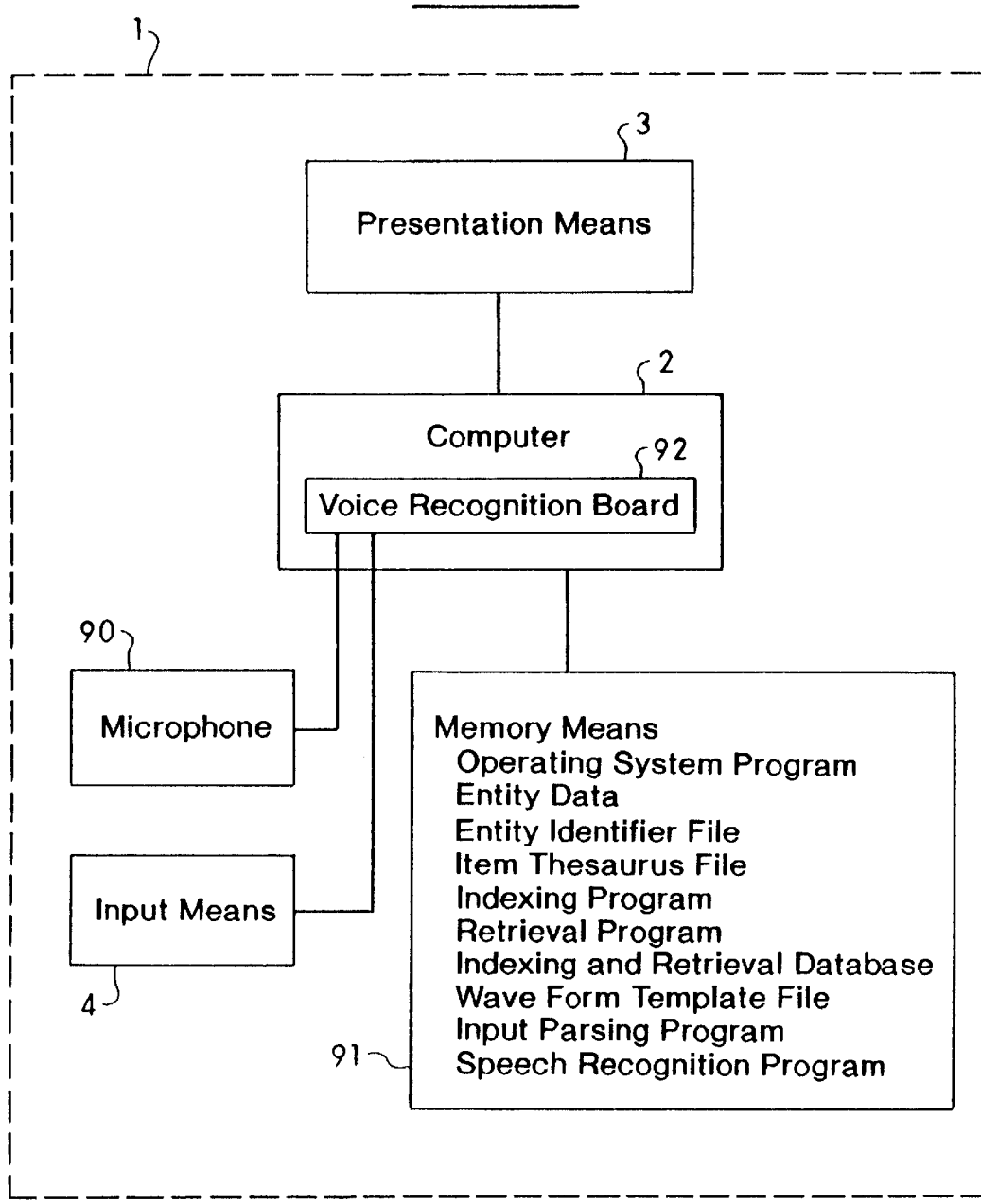
FIG. 11 is a schematic diagram of a computer system used for indexing, retrieving, and presenting entity data when speech is the input means used to retrieve entity data.

FIGS. 2, 8, 9, and 10 show various computer-based systems that, in addition to the system shown in FIG. 1, can be used by a person who wants to retrieve entity data by using an input means 4, such as a keyboard or mouse. For certain applications, including those in which an elderly or handicapped person is unable to use a keyboard or other manual input means, the systems shown in FIGS. 1, 2, 8, 9, and 10 can be augmented, for example, as shown in FIG. 11, with a microphone 90, a voice recognition means 92, and appropriate software stored in a memory 91 that enable the translation of human speech 97 into digital data that is processed and used, as shown in FIG. 13, to input descriptors as a processing step prior to the steps in the retrieval process used for manual input of descriptors outlined in the flow chart shown in FIG. 4.

Figure 4A:
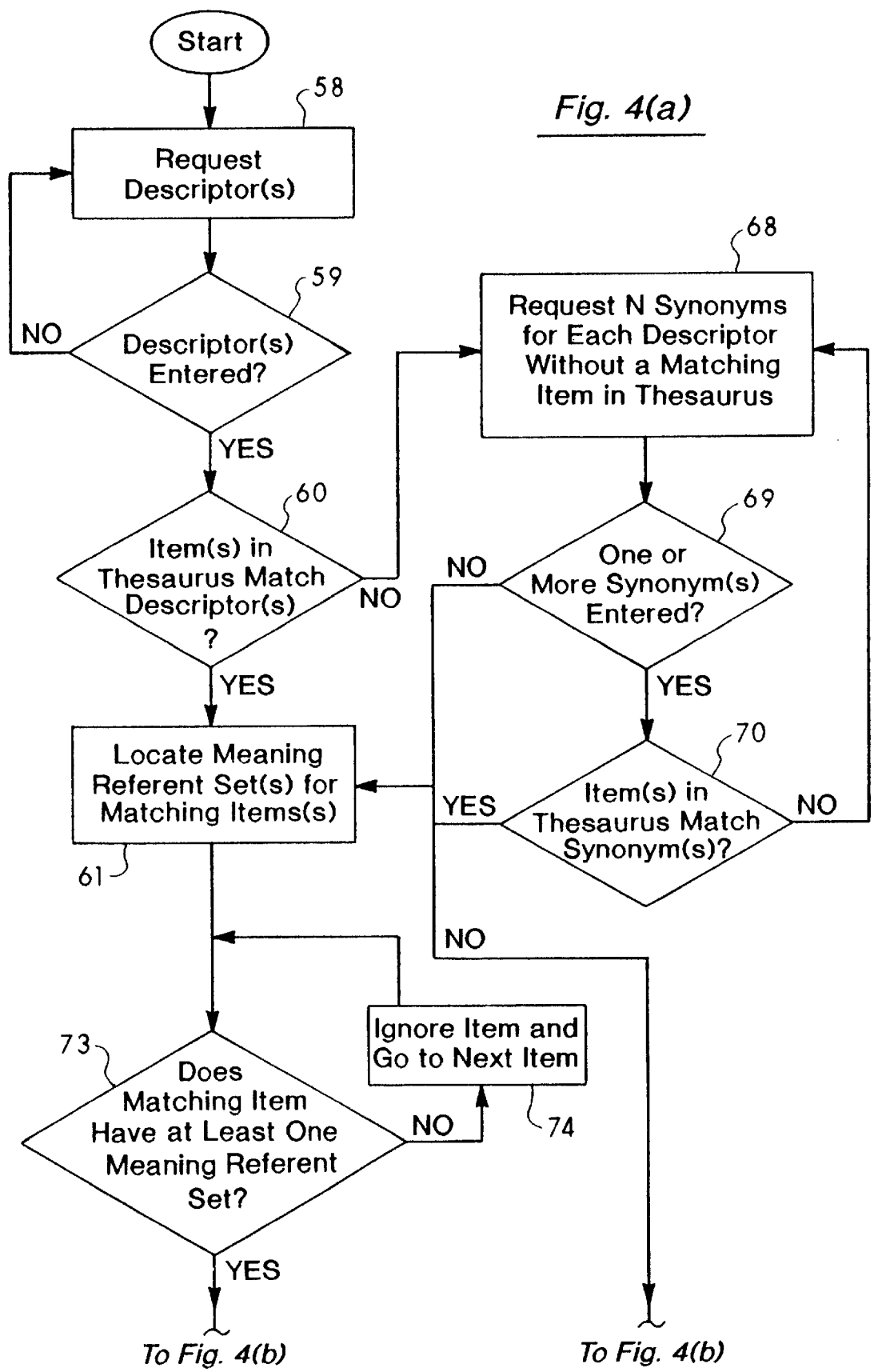
FIGS. 4(a) and 4(b) are flow charts of the overall method for retrieving entity data by this invention.
Figure 4B:
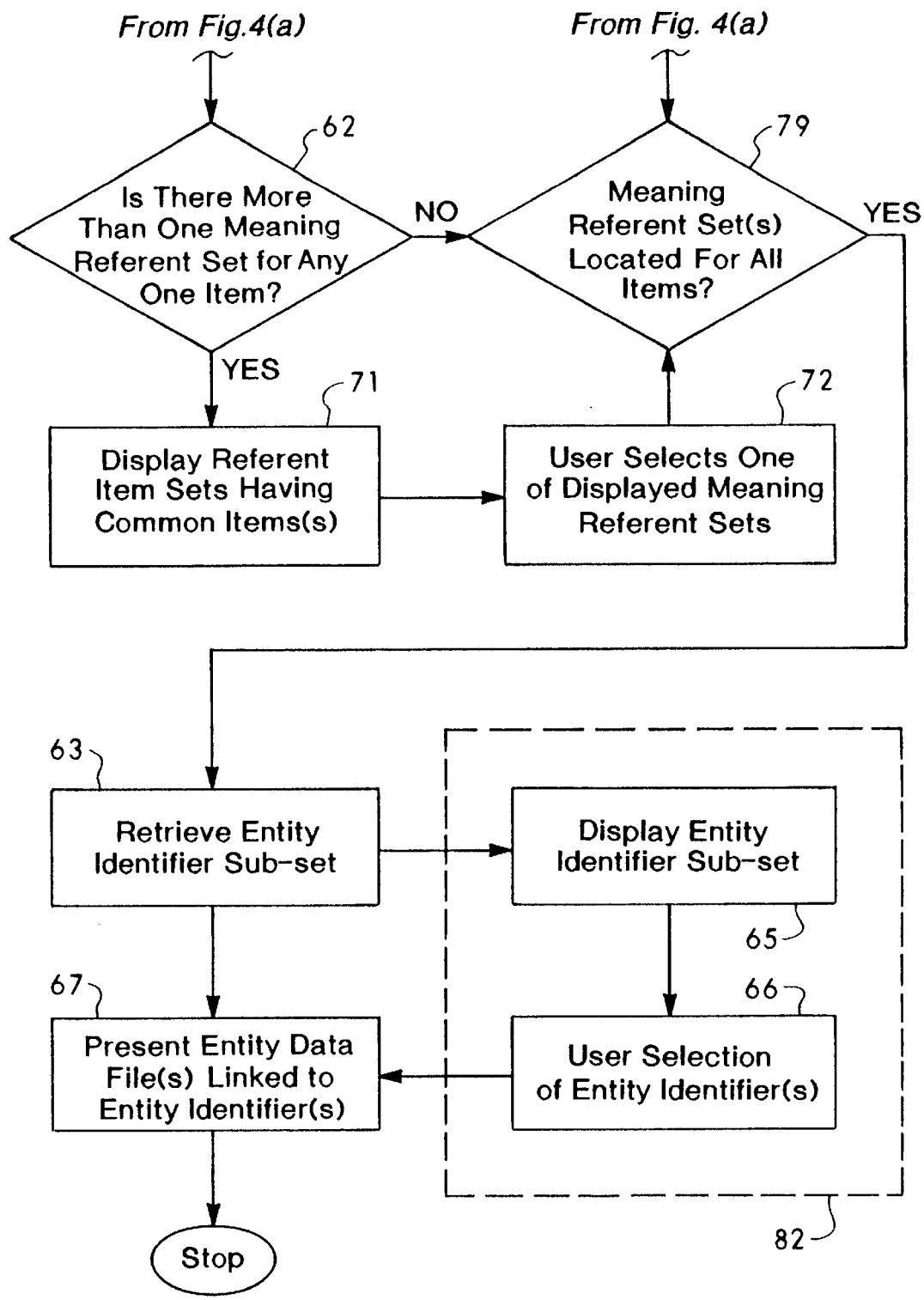

The first step in the retrieval process is for the searcher, in response to a prompt 58, shown in FIG. 4, to input one or more descriptors that describe the desired entity or entities to be retrieved from the database ("descriptor entry") 59. In the preferred embodiment, a descriptor entry consists of a sentence, phrase, or other input created by the searcher and input by using, for example, a keyboard 4 and displayed on a presentation means 3, shown in FIG. 2, such as a color monitor or a television set 9, shown in FIGS. 8 and 9. If the present system is being used, for example, to retrieve and display social expression card designs, a typical descriptor entry might be "Get well card for a man who likes golf." The descriptor entry is either entered as or (as for a voice input wave form) identified by a character string that is analyzed by a retrieval program (e.g., Where-O-Ware?—Onkor, Ltd., P.O. Box 240, Masonville, Colo. 80541) that compares each group of characters separated by spaces (words) with items listed in an item thesaurus file 21, as in FIG. 5, stored in a memory 7 such as a CD-ROM or hard disk drive. If one or more matching items, for example, "GET WELL," "MAN," and "GOLF," are found in the item thesaurus file 21 and these items are linked to meaning referent sets, then the entity identifier sets previously linked to the meaning referent sets during the indexing process are retrieved.

In the preferred embodiment, some items in the item thesaurus will not be found in a meaning referent set, for example, the character strings "FOR," "A," and "WHO." Thesaurus items that are not also items in a meaning referent set may include single characters other than the numerals 0 through 9 and certain parts of speech. In the English language, these parts of speech may include, but not be restricted to, articles (e.g., a, an, the) and conjunctions (e.g., an, but, or, if, when, as, because, though, either, or, both, and, etc.). Words that are not items in a meaning referent set are ignored as descriptors if they are input by a searcher.

When certain descriptors are found in a defined relationship to a second descriptor, the second descriptor will be ignored. For example, the items "dislikes" and "doesn't like" when found adjacent to and preceding a second item (e.g., "fishing") will cause the item "fishing" to be ignored, thereby preventing retrieval of entities indexed by using either the term "fishing" or any other item in the meaning referent set that includes the item "fishing."

Figure 6:
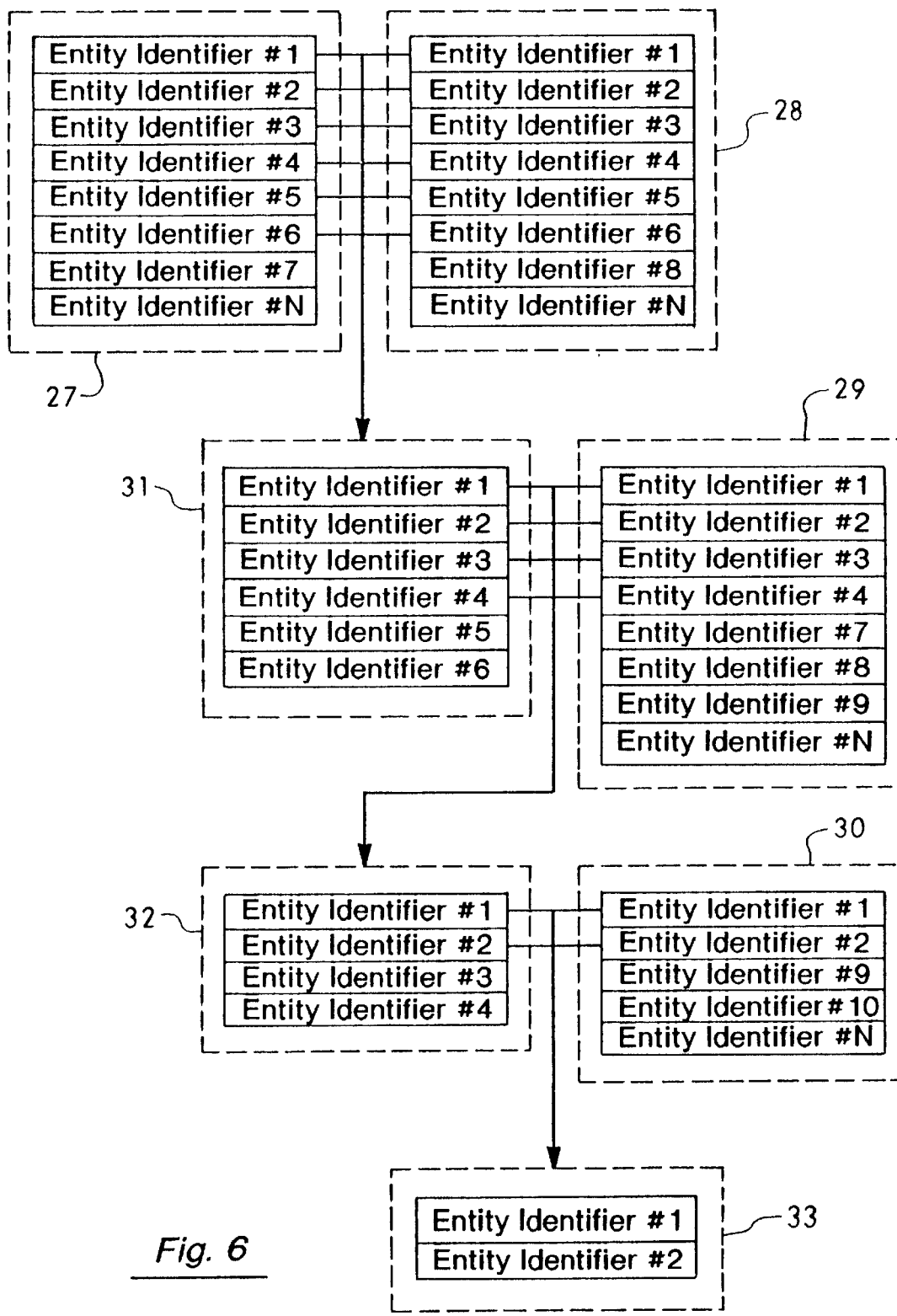
FIG. 6 is a diagram of the process whereby an entity identifier subset is created during the entity data retrieval process.

In one embodiment, when meaning referent sets have been located for those items not excluded as described above, a subset 33 of entity identifiers that have links to all of the meaning referent sets 83 is then created by the process shown in FIG. 6. In this process, a first entity identifier set 27 is compared with a second entity identifier set 28 to create an entity identifier subset 31 made up of entity identifiers that are common to the entity identifier sets compared. This entity identifier subset 31 is then compared with a third entity identifier set 29 to create a second entity identifier subset 32. This process is repeated until a second to last entity identifier subset 32 has been compared with a last entity identifier set 30 to create a last entity identifier subset 33.

Descriptor entries, meaning referent sets, and entity identifier sets may be sorted, compared, and analyzed in a variety of ways to restrict the number of entities presented. For example, the relationship between descriptors within a character string may be analyzed according to grammatical or other rules of context analysis to determine which descriptors and their associated meaning referent sets should be used to retrieve entity data and what, if any, priority or other relationship between the descriptors and meaning referent sets should be used in selecting entities for presentation. For example, the descriptor character string "BLACK STALLION IN A GREEN PASTURE" could be analyzed to identify the nouns "STALLION" and "PASTURE" along with their respective modifiers "BLACK" and "GREEN." If this analysis were not done, the words "BLACK" and "GREEN" would be incorrectly treated as independent descriptors rather than modifiers of other descriptors. Techniques for linguistic context analysis are well known to those skilled in the art and therefore need not be described here in detail.

The final step in the preferred retrieval process is to retrieve and present the entities to the searcher, as shown in FIG. 4. The entity data files presented 67 are those logically linked to the entity identifiers in the entity identifier subset 33, shown in FIGS. 6 and 7. In one embodiment shown in FIG. 4, entity data is presented automatically 75 to the user. In a second embodiment 82, the entity identifier subset 33 may be presented 65 allowing the user to select one or more entity identifiers 66, thereby providing the user with the opportunity to control the sequence and/or number of entities presented.

FIG. 11 is a schematic diagram of a computer system used for indexing, retrieving, and presenting entity data in which speech is the input means used to retrieve entity data. FIGS. 12 and 13 are flow charts that outline additional steps associated with the indexing and retrieval process when speech is to be used as the input means to retrieve entity data. The computer system shown in FIG. 11 is identical to that shown in FIG. 1 except for the addition of a speech recognition means 92, for example, a Sound Master II sound card (Covox, Inc., 675 Conger Street, Eugene, Oreg. 97402) supported by a voice recognition software program, for example, the Voice Master Key voice recognition program (Covox, Inc.) stored in a memory 91, and a microphone 90 as either a primary input means or, as shown in FIG. 11, a secondary input means in addition to a keyboard 4.

In one embodiment shown in FIG. 12, the additional steps associated with the indexing process, when speech will be used as the input means to retrieve entity data, are to first input speech 97 to generate waveform data 98 representative of spoken words that are the same as all the text string words in the item thesaurus and, second, store the waveforms in a waveform template file 99 using a memory 91, shown in FIG. 11. This can be accomplished by using a voice recognition software program, for example, the Voice Master Key voice recognition program (Covox, Inc.). When using the Voice Master Key program, each waveform may be named 100, for example, by a character string that is the same as the matching words in the item thesaurus.

Additional steps, shown in FIG. 13, that may be associated with the entity retrieval process when speech is used as the input means are, for example, first to prompt the searcher 101 to vocally input one or more descriptors by using a microphone 90, as shown in FIG. 11. Any of several methods might be used to activate a microphone 102 to accept a voice input, for example, the searcher's voice input might be required to occur during a prescribed time period, for example, fifteen seconds, after a second input means 4, as shown in FIG. 11, for example, the space bar on a keyboard, has been actuated by the searcher. In the second step, the waveform or series of waveforms generated by the searcher's speech input ("waveform input") are analyzed 103 by a voice recognition software program, for example, the Voice Master Key voice recognition program (Covox, Inc.), which determines if a matching waveform or group of matching waveforms exist in the waveform template file 104. When a matching waveform is found 105, the third step, is to input the waveform name or names ("speech descriptors") for waveform templates in the template file that, in turn, match the waveform input, as descriptors 106.

Speech descriptors are thereafter processed the same as descriptors input in the manner described previously and shown in FIG. 4. Waveform inputs that have no matching waveform templates are ignored. Other methods of utilizing speech input, which are well known to those skilled in the art, may also be used to retrieve and present entity data under the present invention.

Figure 8:
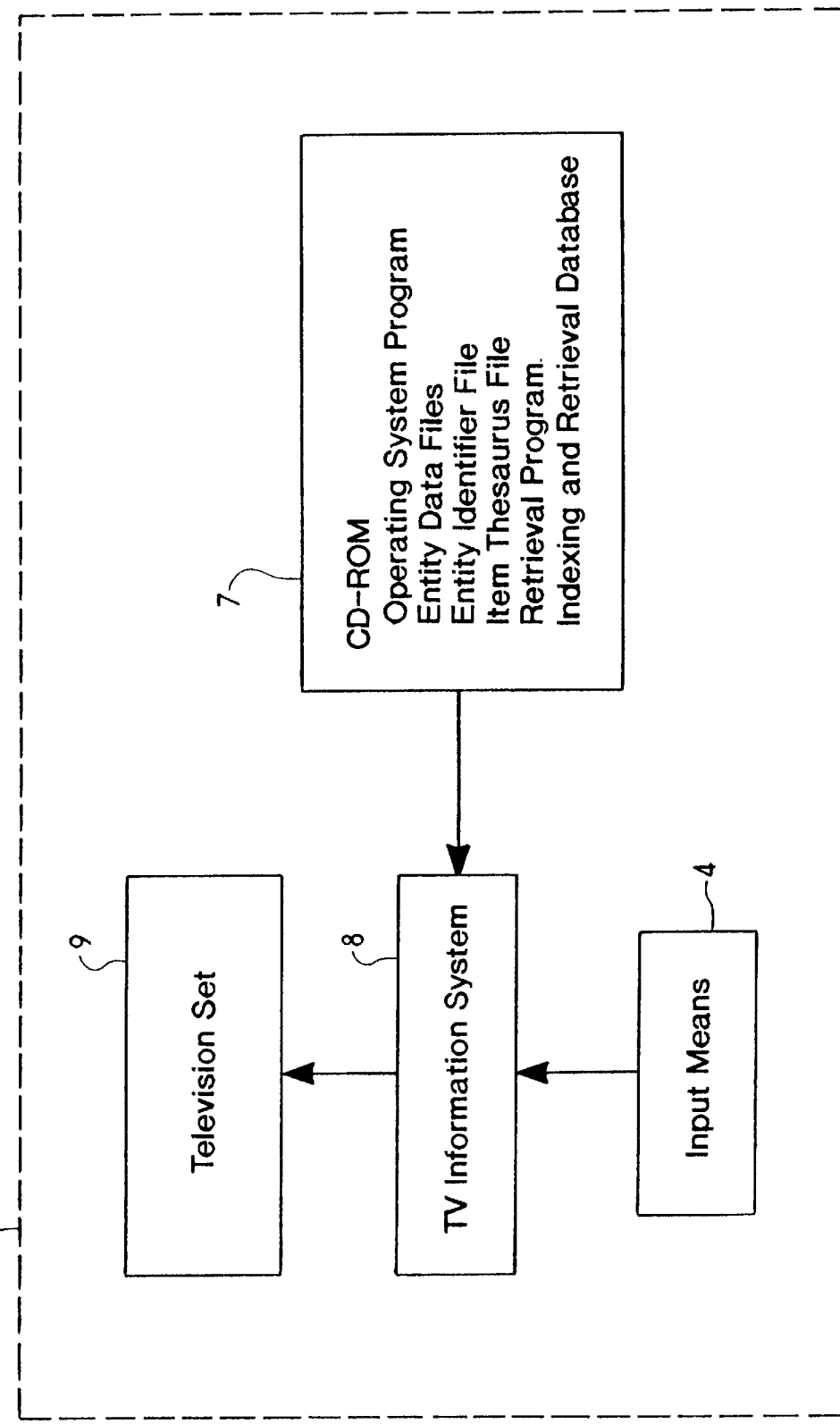
FIG. 8 is a schematic diagram of a television information system used for retrieving and presenting entity data.
Figure 9A:
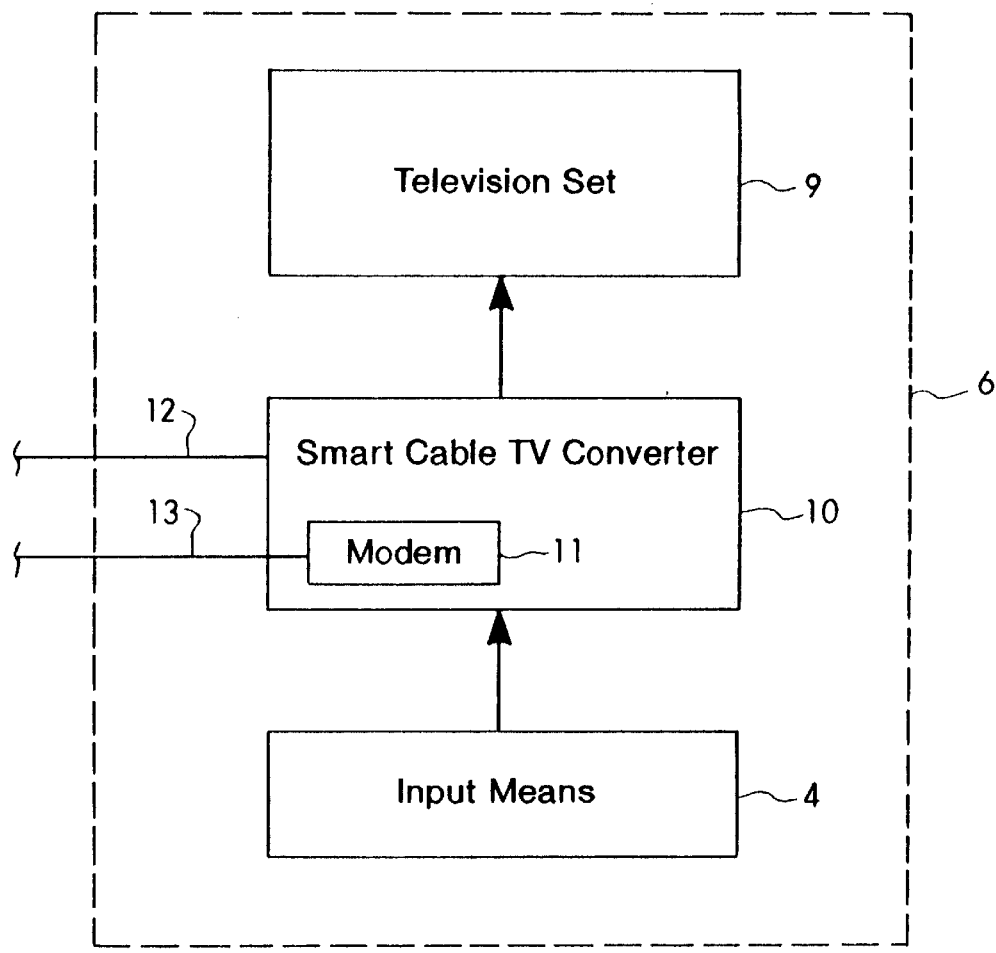
FIGS. 9(a) and 9(b) are schematic diagrams of an interactive cable television system used for retrieving and presenting entity data.
Figure 9B:
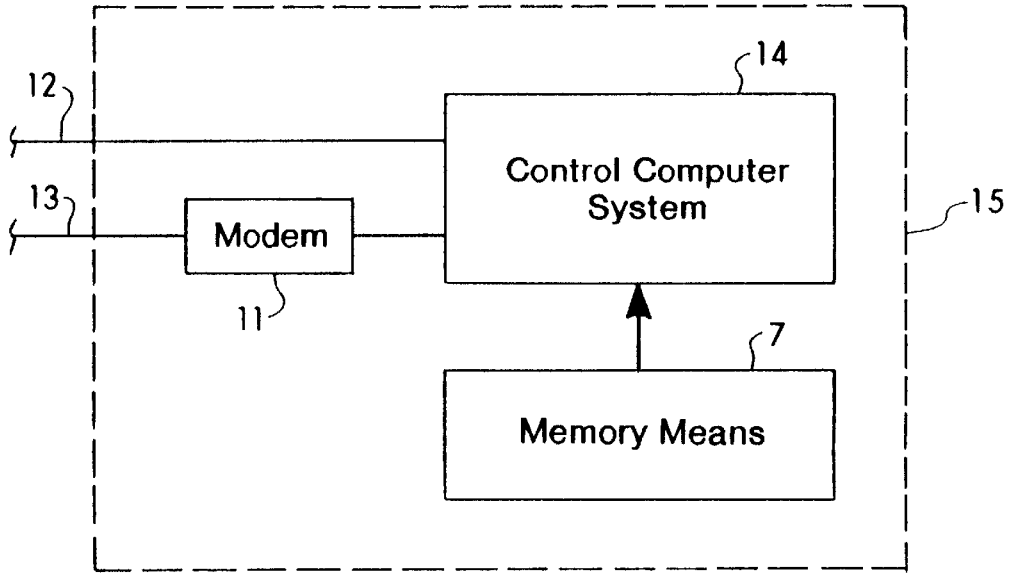

FIGS. 8, 9, and 10 show other embodiments of an entity data retrieval system. The system shown in FIG. 8 utilizes a television information system 8, for example, a Video Information System ("VIS") (Tandy Corporation, 1000 Two Tandy Center, Fort Worth, Tex. 76102), with an integral CD-ROM drive to retrieve entity data stored on a CD-ROM and display the data on a connected television set 9. The input means 4 may be, for example, a wired or wireless hand-held controller (Tandy Corporation).

The system shown in FIG. 9 utilizes a smart cable television converter ("CATV converter") 10, for example, a Jerrold Digicable converter with interactive TV capability (General Instrument Corporation, Jerrold Communications Division, 2200 Byberry Road, Hatboro, Pa. 19040), to retrieve and display entity data on a television set 9. The input means 4 may be, for example, a wired or wireless hand-held controller (General Instrument Corporation). In one embodiment shown in FIG. 9, entity data is stored on a hard disk, CD-ROM disk, video disk, or other memory means 7 attached to a control computer system 14 ("server") at a cable television operations center 15 ("headend"). In one embodiment, descriptors input by a searcher are transmitted through a modem 11 associated with a CATV converter 10 and through a telecommunications link 13 (e.g., a telephone line) to a second modem at the headend 15 and then to a server 14. Entity data can then be transmitted from the server 14 to the CATV converter 10 over fiber optic cable, coaxial cable 12, or other equivalent means. Alternatively, the server 14 may be located at a node in the CATV distribution system, for example, where a fiber optic trunk is connected to a number of coaxial cables that are in turn connected to CATV converters. Other methods of linking CATV converters and servers are also possible and are well known to those skilled in the art.

FIG. 10 shows an alternative retrieval system 6 consisting of a computer 2, a memory 96, presentation means 3, and input means 4. The system is connected through modems 93 and a telecommunications link 94 (e.g., a telephone line) to a second computer system 95, consisting of a computer 2 and a memory 66. All program files and other data necessary for retrieval and presentation of entity data on the presentation means 3 of the entity data retrieval system 6 are stored in the memory 66.

The preceding discussion has focussed on use of the present system to index and retrieve a database of designs for social expression cards. It should be expressly understood that the present invention can be employed to index and retrieve images and related data in a wide variety of fields of use, such as video segments, multimedia presentations, photographs, document images, slides, movies, and audio data.

The above disclosure sets forth a number of embodiments of the present invention. Other arrangements or embodiments, not precisely set forth, could be practiced under the teachings of the present invention and as set forth in the following claims.

We claim:

1. A system for indexing and retrieving information for social expression cards comprising:

means for linking said information for each social expression card to a set of descriptors;

means for allowing a user to enter one or more search descriptors;

thesaurus means for expanding the list of search descriptors by including equivalent words for the search descriptors; and means for retrieving said information for social expression cards linked to said search descriptors or equivalent words for said search descriptors in said expanded list.

2. The system of claim 1, wherein said information for each social expression card comprises one or more data files containing the images, text, and formatting information linked to an identifier.

3. The system of claim 1, wherein each social expression card is identified by an identifier that is linked to one or more meaning referent sets comprised of items in the thesaurus.

4. The system of claim 1, wherein said information comprise photographs.

5. The system of claim 1 wherein the means for entering search descriptors comprises a microphone, and the system further comprises voice recognition means for conversion of speech spoken into the microphone to digital data.

6. A system for indexing and retrieving information for social expression cards comprising:

means for indexing each social expression card by building a thesaurus of descriptors and equivalent words by:
(a) allowing a user to specify at least one descriptor for each social expression card;
(b) allowing a user to specify a number of equivalent words for each descriptor;
(c) incorporating the descriptors and equivalent words into the thesaurus as a meaning referent set; and
(d) linking said social expression card to the meaning referent set in the thesaurus; and means for retrieving said information for selected social expression cards by:
(a) allowing a user to specify at least one descriptor;
(b) locating said descriptors in the thesaurus;
(c) locating any equivalent words for said descriptors in the thesaurus; and
(d) retrieving said information for social expression cards linked to said descriptors or equivalent words for said descriptors in the thesaurus.

7. The system of claim 6, wherein said information for each social expression card comprises one or more data files containing the images, text, and formatting information linked to an identifier.

8. The system of claim 6, wherein each social expression card is identified by an identifier that is linked to one or more meaning referent sets of descriptors and equivalent words in the thesaurus.

9. The system of claim 6, wherein said information comprise photographs.

10. The system of claim 6 wherein the means for entering search descriptors comprises a microphone, and the system further comprises voice recognition means for conversion of speech spoken into the microphone to digital data.

11. The system of claim 6, wherein after the user has specified descriptors, the indexing means searchers the thesaurus for each descriptor and asks the user to verify that any existing meaning referent sets in the thesaurus that include a specified descriptor are appropriate for said social expression cards.

12. A system for indexing and retrieving information for social expression cards comprising:

means for indexing each social expression card by building a thesaurus of descriptors and equivalent words by:
(a) allowing a user to specify at least one descriptor;
(b) allowing a user to specify a number of equivalent words for each descriptor;
(c) searching the thesaurus for each descriptor and any equivalent words;
(d) if an existing descriptor or equivalent word is found in the thesaurus, prompting the user to verify whether any existing meaning referent sets in the thesaurus that contain the descriptor or equivalent word are appropriate for said social expression card;
(e) if the descriptor is not found in the thesaurus, adding the descriptor to the thesaurus;
(f) if the user-specified equivalent words are not found in the thesaurus, adding the user-specified equivalent words to the thesaurus;
(g) linking the user-specified equivalent words to the user-specified descriptor in the thesaurus as a meaning referent set; and
(h) linking the meaning referent set to an identifier for said social expression card; and means for retrieving said information for selected social expression cards by:
(a) allowing a user to specify at least one descriptor;
(b) locating the descriptors in the thesaurus;
(c) locating any equivalent words for the descriptors in the thesaurus; and
(d) retrieving identifiers linked to the descriptors and equivalent words in the thesaurus; and
(e) retrieving said information for social expression cards linked to said identifiers.

13. The system of claim 12, wherein each social expression card comprises an identifier linked to one or more data files containing the images, text, and formatting information.

14. The system of claim 12, wherein said information comprise photographs.

15. The system of claim 12 wherein the means for entering search descriptors comprises a microphone, and the system further comprises voice recognition means for conversion of speech spoken into the microphone to digital data.

* * * * *